United States Patent [19]

Lyda

[11] 3,710,822
[45] Jan. 16, 1973

[54] FLUID-FLOW FUSE

[76] Inventor: Samuel J. Lyda, Route 2, Flat Rock, Ala. 35966

[22] Filed: Jan. 25, 1971

[21] Appl. No.: 109,301

[52] U.S. Cl. ................. 137/549, 137/460, 137/498, 137/519
[51] Int. Cl. .............................................. F16k 11/06
[58] Field of Search...... 137/549, 498, 460, 461, 519, 137/519.5, 486; 210/430, 177, 132

[56] References Cited

UNITED STATES PATENTS

| 3,400,734 | 9/1968 | Rosenberg | 137/460 X |
| 3,183,928 | 5/1965 | Rosenberg | 137/460 |
| 2,775,978 | 1/1957 | Bunnell | 137/461 X |
| 2,780,492 | 2/1957 | Stine | 137/519.5 X |

*Primary Examiner*—Harold W. Weakley
*Attorney*—Harold C. Hogencamp

[57] ABSTRACT

An improved pressure-actuated shut-off device designed as a fail-safe mechanism which automatically shuts off the flow of liquid hydrocarbon fuel or other organic liquids or gases when a pre-determined differential in pressure is reached. Particularly adaptable to use in or with liquid-fuel filters.

3 Claims, 6 Drawing Figures

PATENTED JAN 16 1973  3,710,822

Samuel J. Lyda
INVENTOR.

BY H. C. Hogencamp
AGENT

FLUID-FLOW FUSE

This invention relates to an improved pressure-actuated shut-off device which I term a FLUID-FLOW FUSE.

For certain applications, such as in liquid-fuel filters and the like, it is highly desirable and often necessary to provide or include a shut-off device: i.e., a device which will completely shut off all fluid flow when the filter has reached its full capacity for removal of free-water content and other extraneous contaminants from the liquid hydrocarbon fuels and/or other organic liquids. Such a shut-off device must inherently be fully automatic and positive in its action. It must act as a fail-safe mechanism which completely shuts off all liquid flow under its designated operating condition, regardless of external liquid pressure. The device which is the subject of this application meets such need, although its use is not limited thereto.

Fuel-flow cut-off devices are not unknown in the prior art. One such device employs a compressed coil spring held under tension by a strip of hydrophilic paper. This constrictive paper is not wettable by the organic fuel being filtered but is weakened and breaks apart when water-wetted, thus releasing the tension on the spring and the spring-operated valve then acts to close the fuel line. Obviously, since the shut-off action can only be accomplished by water-wetting the paper, this shows that water contaminant is present or would be present in the fuel passing through the filter after the filter itself is water-saturated.

Another device employs a plastic ball acting in conjunction with an aluminum ring. When sufficient differential pressure is exerted upon the plastic ball it acts to rupture the aluminum ring. The ball then passes through the enlarged (ruptured) opening in the aluminum ring and is pressure-forced to form a seal with an opening at the bottom or outflow end of the filter. This device is pressure-activated but it is to be noted that: (1) The input is not initially sealed by the ball until external fuel pressure is exerted; (2) The device becomes activated only when fuel pressure has forced the plastic ball to physically rupture the aluminum ring; (3) The plastic ball itself forms one component of both the input seal and the shut-off seal, thus the two seals or valves are not independent entities; (4) The plastic ball could be scratched or damaged when it ruptures the aluminum ring, thus reducing its shut-off closure effectiveness.

The device disclosed herein employs two distinctly separate valves, each composed of its own independent component parts, with means intermediate of the two to actuate the output shut-off valve. Further, the input valve is firmly closed, even before the device is put into use, thus assuring positive closure action and preventing any possibility of contaminants entering through this valve or affecting its closure before it is actuated.

With the foregoing in mind, the primary object of this invention is to provide a fully automatic pressure-operated fail-safe fluid-flow cut-off device which is positive in action, simple in construction, reasonable in cost, and adaptable to use in combination with or integral of a liquid-fuel filter.

A second object is to provide such a cut-off device which is not limited in scope to use with liquid-fuels but is equally-well operable with other organic liquids or gases where pressure differentials are involved.

Other objects will become apparent from the following description, together with the accompanying drawing and the appended claims.

For the purpose of description one FIGURE of the accompanying drawing shows the FLUID-FLOW FUSE incorporated into a cylindrical liquid-fuel filter of standardized shape and size, although obviously its use is not to be construed as limited thereto.

In the drawing.

Referring now in more detail to the drawing in which like numerals designate like components.

Figures 1, 2, 3, 4, 5, 6:
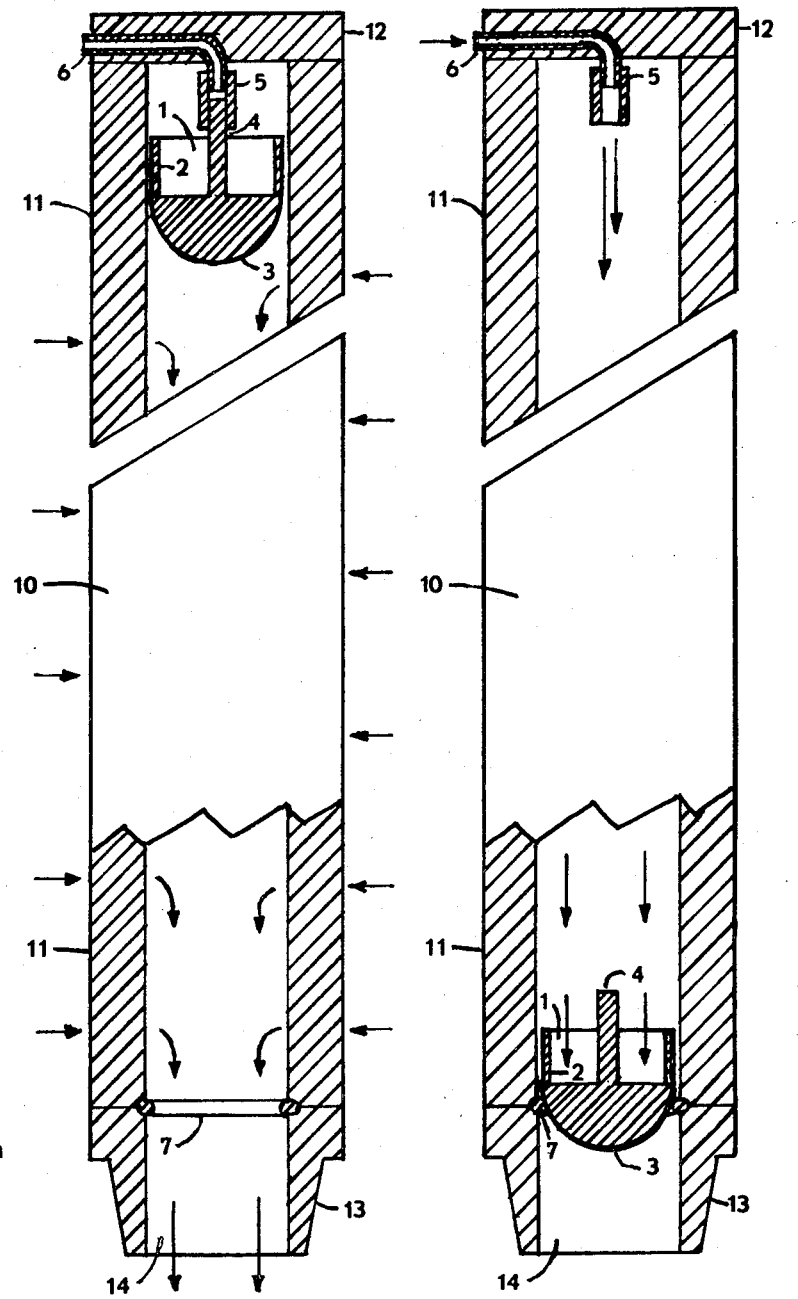
FIG. 1 shows top and side views of one preferred construction of (the operative section of) my device.
FIG. 2 is a top view of one preferred form of sealing O-ring.
FIG. 3 shows the complete device as initially incorporated into a liquid-fuel filter of cylindrical physical form.
FIG. 4 shows the complete device incorporated into a liquid-fuel filter after pressure-actuation.
FIG. 5 shows, in cross-section, a variation of the shut off elements of my device.

In these FIGS.: 1 designates a cylindrical shaped cup, essentially an open hollow tube 2 at its upper end and bullet-shaped or semi-globular at its lower enclosed end, 3. This cup section, 1, is made of a solid material or materials compatible with the hydrocarbon fuel or other organic liquid or gas with which the device is to be used. The entire cup 1 might be formed as one part or the upper tubular section 2 and lower semi-globular section 3 could be separately formed, then suitably and firmly joined to form the complete cup 1. Centrally located inside the hollow tubular section 2, a preferably round solid spindle or stem 4 is firmly mounted as by affixing it to the solidly enclosed lower section 3 of cup 1. As indicated, stem 4 extends upwardly and is centered in the tubular section 2. Stem 4, as with all other parts of the device, is formed from a material which is compatible with the liquid or gas being filtered. Physically, the entire cup 1, including end portions 2 and 3 and stem 4 might conveniently be formed or molded as one integral part. The activating or operative section of the device includes a hollow tube 6, having a solid outer wall bent substantially as shown when used in the manner to be herein described. The activating section of the device is then completed by a short piece of flexible tubing 5 made of neoprene rubber or some other compatible elastic polymer. As shown in the drawing, the upper open end of tubing 5 is snugly fitted over the lower open end of tube 6 and might be firmly affixed thereto, while the upward-extending end of solid stem 4 is inserted, also snugly, into the lower open end of tubing 5. Separated from the other components, but essential to the shut-off action of the device is a sealing O-ring 7.

FIG. 3 shows the fluid-flow fuse, in cut-away form and turned 90° from the FIG. 1 side view, as it might be mounted for operation in a liquid-fuel filter 10 of standard cylindrical design. In this FIG. the fuel filter 10 is shown in partially cut away form, with the entire outer wall designated 11 and end caps designated 12 and 13. In actuality outer wall 11 includes inner and outer support tubes and various layers of filter material or materials. However, the designation of the entire outer wall as 11 suffices for the purpose of describing the operation of my device. Outer wall 11 encloses an open passage 14 for the normal flow of the filtered liquid outwardly through the open end cap 13. In this FIG. the components of the fluid-flow fuse are identical to those of the other FIGS. and are so designated. In FIG. 3, and likewise in FIG. 4 which shows the same components as FIG. 3, the direction and path of the pressurized liquid flow is indicated by arrows.

My fluid-flow fuse might also be termed a pressure-activated shut-off device and a proper understanding of its operation necessitates a brief description of the operation of a liquid-fuel filter of the type shown in FIGS. 3 and 4.

Such liquid-fuel filters might be used singly or, more often, in multiple groups or banks. In either case the filter or filters are mounted inside a chamber in such manner that the liquid fuel or other organic liquid which is to be filtered is forced through the filter, under pressure, from outside the outer filter-wall 11 and then flows out from the hollow interior or passage 14 of the filter device by way of lower open ended cap 13 into a pipe line. The liquid being pressure-forced through the outer filter-wall 11 is filtered and so has free-water content and other extraneous contaminants removed thereby. As the free-water contaminant is removed, this water is in one way or another accumulated by the filter material as by adsorption, absorption, saturation, etc. In any case, the filter materials employed do have a limit of saturation point after which they cannot further perform their filtering function and so there should be no free-flow of liquid through the filter, even under raised external pressure. As previously stated, and under such fully-saturated conditions there still is likely to be a reduced flow of liquid but it might then contain an undue amount of associated free-water content. Under such conditions some form of fail-safe shut-off device becomes essential. Even with my IMPROVED LIQUID-FUEL MONITOR FILTER (U.S. Pat. No. 3,572,510), which does in itself completely shut off all liquid flow when its filter action reaches saturation, because of the hydrogen-bonding of water with its filter component, such a fail-safe shut-off device is still highly desirable and provides an additional safety factor.

The operation of my presently-disclosed device is simple and is easily understandable when considered in relation to the foregoing description of the operation of a liquid-fuel filter.

As shown in the construction of FIG. 3, with the fluid-flow fuse positioned as initially mounted in a liquid fuel filter, the hollow tube 6 is sealed-in or molded-in to end cap 12 of filter 10 in such manner that its upper open end protrudes outwardly from the filter. The lower end of tube 6 then terminates inside the filter with its connection to flexible tubing 5. The hollow cup structure 1 of the fuse, including its upper tubular section 2 and lower fully-enclosed semi-globular shaped section 3 are affixed to the lower end of flexible tubing 5 by means of stem 4. Sealing O-ring 7, made of a compatable rubber or plastic material as here shown, is firmly affixed to end cap 13 of filter 10 and is centered with the passage 14 thereof.

Fluid flow through the filter is, as stated, from outside in as indicated by the arrows in this FIG. As the filter media becomes contaminated the differential pressure between the outside and the inside of the filter structure increases or builds up. As this differential increases the pressure inside the filter decreases, relative to the external fuel-pressure. When this inside pressure becomes sufficiently low that a predetermined increased differential occurs, the external pressure, applied through the open-ended tube 6, will be sufficient to overcome the friction-force holding stem 4 into the lower end of flexible tubing 5, thus pushing stem 4, and the hollow cup structure 1 which it supports, downwardly and away from the then-open end of flexible tubing 5. The liquid fuel will then flow from outside the filter 10, through hollow tube 6 and now-open-ended flexible tubing 5 and into the top hollow tubular section 2 of cup 1. The pressure of this flow will act to force the entire cup structure 1 downwardly through the central passage opening 14 of filter 10, thereby causing the lower fully-enclosed semi-globular section 3 of cup 1 to effectively form a seal with sealing O-ring 7, as shown in FIG. 4. Continued liquid pressure, exerted through tube 6, tubing 5 and the inner open passage 14 of filter 10 into the hollow top 2 of cup 1, as indicated by the arrows in FIG. 4, acts to even more tightly seal section 3 with sealing O-ring 7. As indicated in FIG. 4, the hollow cup 1 is of such size as to be able to move freely in the open passage 14 of filter 11, yet nearly closes passage 14. The desired preselected level of increased differential is effected by the priction-force holding stem 4 into flexible tubing 6 and the sealing action here described occurs when the selected differential is reached, thus completely shutting off all liquid flow from the output fuel line. Since this pressure-actuated sealing action occurs almost instantaneously, to all intents none of the liquid flowing in through tube 6 can get into the output fuel line before complete shut-off.

Arrows in FIG. 3 indicate flow through outside filter wall before the filter elements become "saturated," or filter reaches limits of its ability to remove free-water and other extraneous contaminents from liquid. During this filteration period the differential pressure between outside and inside the filter remains low enough so that the friction-force will continue to maintain the upper-seal between stem 4 and flexible tubing 5. The contact between the stem 4 and tubing 5 must of course be sufficiently tight to prevent fuel flow or leakage at any lower pressure-differential than the critical one. As the filter nears "saturation," little or no liquid will be forced through the outer wall filter elements, thus decreasing the internal pressure and increasing the differential pressure. This overcomes the friction-force and, as previously described, the stem 4 will be forced out of, and downward from, flexible tubing 5. Taking the path of least resistance all or substantially all liquid flow will then occur through tube 6 and attached flexible tubing 5, as indicated by the arrows in FIG. 4, thereby forcing the cup 1 downwardly to seal with sealing O-ring 7 and shut off all liquid flow. The continued liquid pressure through tube 6 and tubing 5 will maintain this seal even after all flow has stopped.

The fluid-flow fuse can be pre-set with great accuracy to become actuated at any desired differential in pressure. Thus, the device can be set to operate slightly before complete saturation of the filter is reached, if this is desirable.

Since my device is actuated by reason of pressure-differential between two chambers or containers of the fluid involved, it can also act effectively as a hydrostatic-surge arrester, cutting off all fluid-flow when a dangerous or excessive surge in incoming fuel-pressure occurs. This, too, proves of great importance since the fuel-filter itself can thus be protected against damage which might otherwise be caused by extremely high incoming-pressure surges. Even though such fuel filters are designed to withstand considerably more pressure than that normally employed, a sudden excessive pressure surge might cause the filter to "blow out" or "tear apart," thus contaminating the effuent stream. Again, the device can be pre-set to operate only when an incoming surge reaches a certain level, at a pre-determined pressure-differential between the outside and the inside of the filter, which is well below the pressure that the fuel-filter structure is designed to withstand.

For purpose of description the fuel-filter 10 and the hollow cup 1 have been shown in an upright position, since this is most often the manner in which such fuel-filters are mounted. Portions of the fuel-flow fuse, including cup 1, have therefore been referred to as "upper" and "lower." It is to be realized that the device can be equally well utilized in other positions since cup 1 is actuated by fluid pressure, without regard to gravity. Of course, the force of gravity would inherently enter in when the device was mounted upright as shown.

As shown in the construction of FIG. 3, with the fluid-flow fuse installed in a liquid-fuel filter, it is to be noted that the larger moving part of the filter, the hollow cup structure 1, is initially positioned at the top of the filter in order to least obstruct normal fuel flow. The sealing O-ring 7 or its equivalent shut-off valve seat is located at the extreme bottom end of the filter, at the open-ended outflow cap 13. When the pressure differential actuates the device the released cup literally shoots through the passage 14 by reason of the pressure exerted into the hollow tubular top section 2 and the cup is forced into and held in a sealed position with sealing O-ring 7. The ball or semi-globular shape of section 3 aids greatly in forming a tight seal.

Differences in construction and/or manufacture could readily be made without limiting the scope of the invention. For example, in the construction shown in FIGS. 3 and 4 and here described, the open passageway provided by sealed-in or molded-in tube 5 could readily consist of a hollow bore through filter cap 12, connecting with a short straight sealed-in, molded-in or threaded-in tube 5 to which flexible tubing 6 was attached or tubing 6, not necessarily flexible, might itself be pressed-in to the filter cap 12. In like manner, the lower enclosed semi-globular shaped section 3 of cup 1 might be formed as a tightly fitting valve (similar to an auto engine valve) which would tightly fit into a valve seal (replacing sealing O-ring 7).

FIG. 5 shows in cross section a variation of the sealing components of my device. In this FIG. the lower section of hollow cup 1 takes the form of a ground or honed valve 3a, similar to the input or output valve of an auto engine. The sealing O-ring of the previous FIGS. is then replaced with valve seal 7a, also similar to its auto engine counterpart.

FIG. 6 shows another possible simplified variation in structure, eliminating the upper hollow cylinder 2 of the device. However, extensive tests have indicated that the hollow cup feature provided by the upper cylinder 2 tends to greatly stabilize the operation of my device and assure a tight shut-off seal between the fully-enclosed lower section 3 and the sealing O-ring 7.

Obviously, the bullet-shaped or substantially semi-globular component 3 could be fabricated from a flexible or resilient material, rather than sealing O-ring 7 which could then be formed of a rigid material, or both parts could be resilient.

From the foregoing it will be seen that my device actually includes two fluid-pressure-controlled valves: The input or actuating valve, which is initially closed and remains friction-force closed until the predetermined pressure differential is reached, is formed by the flexible tubing 5 and the stem 4 which is snugly inserted therein. The output or shut-off valve, comprising semi-globular end section 3 of cup 1 and the sealing O-ring 7 (or other valve means such as shown in FIG. 5) is normally open. This output valve remains open until the device is actuated by excess differential fluid pressure at which time the release or opening of the input valve causes the intermediate closure means to act.

Having thus described my invention, what I claim as new and desire to protect by Letters Patent is:

1. Incorporated into a cylindrical liquid-fuel filter in which the fluid-flow input is through the outer filter wall and fluid-flow output from the hollow interior of the filter is through an open end cap into a pipeline; a fully automatic fail-safe pressure-activated shut-off device comprising, in combination: an initially-closed pressure differential actuating valve; friction-force means which maintains said actuating valve in its initially-closed condition until released and opened by applied external fluid pressure; means including a hollow tube which terminates in an open end protruding outwardly from said filter and through which external fluid pressure is applied to overcome said friction-force and open said actuating valve; a normally-open fluid-pressure-activated output shut-off valve; and fluid-pressure-activated means intermediate of said actuating valve and said output valve for closing and sealing said output valve when said actuating valve is opened by differential fluid pressure.

2. The device as set forth in claim 1, wherein said friction-force means comprises a flexible tube with a solid stem snugly inserted therein.

3. The device as set forth in claim 1, including means whereby said device is actuated at a predetermined differential in pressure, with output pressure being lower than external input pressure.

* * * * *